Oct. 11, 1960
K. E. FAIVER ET AL
2,955,841
WHEEL HOP DAMPER
Filed May 31, 1956
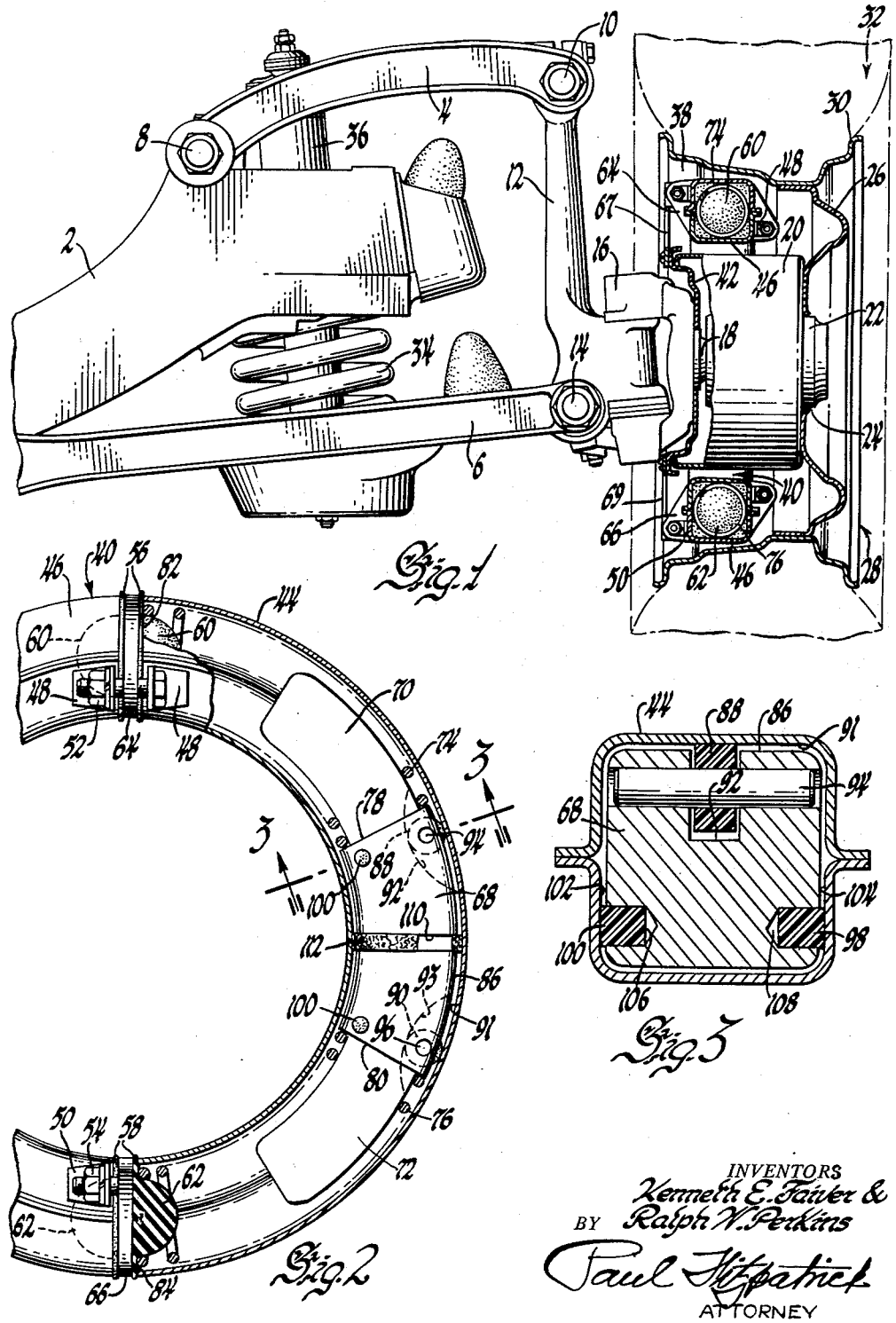
INVENTORS
Kenneth E. Faiver &
BY Ralph N. Perkins
Paul Fitzpatrick
ATTORNEY

United States Patent Office 2,955,841
Patented Oct. 11, 1960

2,955,841

WHEEL HOP DAMPER

Kenneth E. Faiver and Ralph W. Perkins, Lansing, Mich., assignors to General Motors Corporation, Detroit, Mich., a corporation of Delaware Filed May 31, 1956, Ser. No. 588,482

18 Claims. (Cl. 280—124)

This invention relates to wheel hop dampers and more particularly to dynamic absorber type wheel hop dampers.

High frequency low amplitude wheel oscillation has long been recognized as a major source of undesirable handling and ride conditions in motor vehicles. Until very recently, in the typical production vehicle, wheel hop has been controlled, if at all, by the action of conventional shock absorbers. However, since the principal function of the shock absorber is to control high amplitude low frequency oscillation, a compromise valving of the shock absorber is required which produces only partially satisfactory results with respect to either form of wheel oscillation.

More recently it has been proposed to mount dynamic absorbers on the unsprung mass in order to counteract wheel hop. As used herein the term dynamic absorber refers to a device in which a freely oscillatable weight is resiliently supported on the sprung mass, the spring rate of the resilient medium being selected to tune the frequency of vibration of the weight to match the natural frequency of vibration of the wheel. Each of the various forms of dynamic absorbers proposed heretofore possess certain disadvantages which have prevented widespread adoption. Foremost among the disadvantages encountered is the lack of space in which to locate the necessary structure, particularly with respect to independent front wheel suspension. In addition, in independent suspensions wherein the absorber is mounted inboard of the wheel, a counteracting force ratio factor less than unity necessarily results. In consequence, the maximum effectiveness of any previously known form of dynamic absorber has been less than optimum and, therefore, required greater mass than is required where a ratio factor of unity exists.

An object of the present invention is to provide an improved wheel hop damper.

Another object is to provide a wheel hop damper which may be located in the plane of the wheel with which it is associated.

A further object is to provide in an independent wheel suspension, a dynamic absorber type wheel hop damper having a ratio factor of unity.

A still further object is to provide a wheel hop damper for a wheel mounted on a pair of transversely extending spaced apart wishbone arms, wherein the damper is so formed and arranged as to completely avoid interference with any of the conventional parts making up the wheel suspension.

Yet another object is to provide a structure of the stated character in which the damper is resiliently mounted on the unsprung mass in the plane in which wheel hop excitation occurs.

Still a further object is to provide a dynamic absorber for a vehicle wheel which inherently resists "pound through" resulting from extreme single impact bumps encountered by the wheel.

A yet further object is to provide a dynamic absorber type wheel hop damper in which a toroidal body is provided with a pair of oscillatory weights, each of which are normally spring urged to a vertical centered position, the weights being adapted to oscillate in unison at the same frequency but out of phase with the natural frequency of oscillation of the wheel.

Yet another object is to provide a dynamic absorber of the type referred to which is formed and dimensioned so as to permit recessing thereof completely within the annular space between the vehicle brake drum and the wheel rim.

Still a further object is to provide a dynamic absorber of the stated character wherein the slidable weights are provided with anti-friction elements adapted to assure free running operation thereof in the toroidal body.

Still another object is to provide a dynamic absorber of the stated character which is simple in construction, easily assembled, low in cost, and highly efficient in operation.

These and other objects, features and advantages of the invention will become more fully apparent as reference is had to the accompanying specification and drawing wherein:

Fig. 1 is a fragmentary front elevational view of a wishbone type independent front suspension employing the present invention.

Fig. 2 is an enlarged fragmentary view, partly in section, illustrating the form and relation of the parts of the absorber mechanism; and Fig. 3 is a sectional view looking in the direction of arrows 3—3 of Fig. 2.

Referring now to the drawing and particularly Fig. 1, there is illustrated an independent front wheel suspension in which the numeral 2 designates the front cross frame member. Extending transversely outwardly from cross frame member 2 are vertically spaced upper and lower wishbone arms 4 and 6, respectively. Arm 4 is pivotally connected at its inner end to cross frame member 2 on a longitudinally extending pivot shaft 8, while lower wishbone arm 6 is connected at its inner end to frame member 2 on a similar horizontal pivot shaft, not shown, spaced laterally inwardly relative to pivot shaft 8. At its outer end, arm 4 is pivotally connected at 10 to the upper end of wheel knuckle support 12. The outer end of lower wishbone arm 6 is pivotally connected at 14 to the lower end of knuckle support 12. Wheel knuckle 16, in turn, is pivoted to knuckle support 12 on a generally vertically extending axis in order to permit steerability of the knuckle relative to the support. Formed integrally on knuckle 16 is a wheel spindle 18, on which is rotatably mounted a vehicle wheel brake drum 20. Drum 20 is provided with a pilot portion 22 which is adapted to receive the central opening 24 formed in the wheel body 26 of vehicle wheel 28. The rim portion 30 of wheel 28 is attached to wheel body 26 so that the centerline of the tire 32 is substantially in line with the central plane of brake drum 20.

Disposed between the intermediate portion of lower wishbone arm 6 and the outer end of cross frame member 2 is a coil spring 34 which resiliently supports frame 2 relative to wheel 28. A telescoping shock absorber 36 is disposed concentrically within spring 34 and is connected at its opposite ends to arm 6 and frame 2, respectively. It should be understood, however, that the present invention is not limited to any particular spring and shock absorber or any arrangement thereof, the form being shown for illustrative purposes only. Similarly, the form of wheel knuckle support 12 and knuckle 16 may take the form of an integral member pivotally connected to arms 4 and 6 by ball joints, or other known forms.

Disposed in the annular cavity 38 between rim 30 and brake drum 20 and connected to brake backing plate 42 is toroidal structure 40 which is adapted to counteract wheel hop forces. Referring now to Fig. 2, it will be seen that absorber 40 is formed of hemi-toroidal sheet metal casings 44 and 46 which are generally rectangular in cross section (Fig. 3) and disposed in endwise abutting engagement. Near their respective upper and lower ends, casings 44 and 46 are provided with L-shaped brackets 48 and 50. Casings 44 and 46 are maintained in assembled relation by means of machine bolts 52 and 54 which extend through openings formed in brackets 48 and 50. Prior to assembly, a pair of flanged resilient members 56 and 58 are disposed between the upper and lower abutting ends of casings 44 and 46. Each member 56 and 58 is formed with a hemispherical bulged portion 60 and 62, the purpose of which will be described shortly. Disposed between the flanged portions of each resilient member 56 and 58 are attachment plates 64 and 66. Each plate 64 and 66, in turn, is connected to the nonrotating brake backing plate 42 by means of upper and lower attaching legs 67 and 69.

As may be evident from Fig. 2, each half of the toroidal body 40 forms a complete absorber structure; that is, each casing 44 and 46 is provided with identical internal construction shortly to be described, capable of counteracting wheel hop. By utilizing duplicate symmetrical construction, maximum advantage is taken of the relatively restricted space available, while gaining the advantage of developing counteracting force in exactly the same plane in which maximum wheel hop forces occur. In addition, since the parts are symmetrical, fabrication of both halves requires only one set of tools and dies. Since the construction and operation of both halves of the absorber are identical, the description which follows will be confined to the structure and arrangement relative to casing 44 only, it being understood that the internal construction of casing 46 is identical except in the reverse sense.

Disposed within casing 44 is an inertia mass in the form of a weight 68 of cast iron or other suitable material. Weight 68 is curved to conform with the curved path defined by the interior of casing 44 and possesses a generally rectangular cross sectional configuration providing running clearance with the inner walls of casing 44. The opposite ends 70 and 72 of weight 68 are somewhat reduced in cross section to provide clearance for coil springs 74 and 76. The inner ends of springs 74 and 76 engage the shoulders 78 and 80, respectively, of weight 68, while the outer ends thereof engage the end walls 82 and 84 formed by resilient members 56 and 58.

Springs 74 and 76 are effective to normally urge weight 68 to a neutral vertical central position between end walls 82 and 84. In addition, the spring rate of springs 74 and 76 is selected to cause weight 68 to oscillate at the same frequency as the natural frequency of vibration of wheel 28, but out of phase therewith.

In order to reduce frictional resistance to oscillation of weight 68 is casing 44, the outer side 86 of the former is provided with a pair of spaced apart rollers 88 and 90 which engage the wall 91 of casing 44. As seen best in Fig. 3, rollers 88 and 90 are disposed in arcuate slots 92 and 93 formed in weight 68 and are retained therein by means of transversely extending journal pins 94 and 96. Additional bearing elements 98 and 100 engage the side walls 102 and 104 of casing 44. Elements 98 and 100 are preferable in the form of plugs which extend into transverse bores 106 and 108 formed in weight 68. It will now be seen that bearing elements 98 and 100 and rollers 88 and 90 are effective to maintain running clearance between the weight 68 and inner walls of casings 44 and 46, as well as to assure low frictional resistance to oscillation of the weight. In order to assure silent operation and long service life, rollers 88 and 90 bearing elements 98 and 100 are preferably formed of plastic material such as Nylon or Teflon.

Formed centrally on weight 68 is a circumferential groove 110 in which is disposed a damping seal 112 of felt or other suitable material, the purpose of which is to damp the amplitude of oscillation of the weight. It will be understood that the density and thickness of seal 112 may be varied to attain the desired amount of damping. In addition, a small quantity of oil is preferably introduced into the interior of toroidal casing 44 to assure effectiveness and long service life of the damping seal.

In order that the numerous advantages of the present invention may be more fully understood, a description of operation follows. As mentioned previously, the spring rate of springs 74 and 76 is selected so as to cause oscillation of weight 68 at a frequency identical to natural wheel hop frequency but out of phase therewith. It will, of course, be understood that selection of the proper rate depends upon several variable factors, and must be computed for each individual case to take into account the difference in basic suspension design. When road conditions are encountered which cause wheel hop, weight 68 will also oscillate at the same frequency as the wheel hop frequency but out of phase therewith and thereby produce force impulses tending to counteract the force impulses generated by wheel hop. It should be particularly noted that in the present invention, the counteracting forces generated by each weight 68 are directly in line with as well as opposite to the wheel hop forces. Therefore, a ratio factor of unity exists. By way of comparison, in previous known types of damper constructions, the damper has been located inboard of the wheel and, therefore, the ratio of counteracting forces to wheel hop forces has been less than unity. Because of this advantage, the present invention permits an absorber construction of appreciably lower total mass than has heretofore been required to accomplish the same degree of wheel hop damping.

Another feature of particular note is that normal oscillation of weights 68 above and below their vertically centered position occurs through a path which is substantially vertical or parallel with the path of wheel hop. However, as the weights approach extreme positions at either end of their associated casing, the direction of travel of the weights progressively approaches the horizontal. Thus, extremely violent wheel oscillation is required in order to accelerate the weights sufficiently to cause impact with the hemispherical bump stops 60 and 62 at either end of the respective casing. This feature assures substantially complete freedom from the tendency of the weight to "pound through" or "bottom" against the stops, such as may occur in conventional rectilinear dampers when the wheel encounters road conditions producing a severe single impact bump.

While but one embodiment of the inveniton has been shown and described, it will be apparent that numerous changes and modifications may be made therein. It is, therefore, to be understood that it is not intended to limit the invention to the embodiments shown but only by the scope of the claims which follow.

We claim:

1. In combination, a vehicle wheel including a tire rim, a brake drum, said rim and said wheel being coaxially rotatably mounted so as to provide an annular cavity between said rim and said drum, a hollow body disposed in said cavity, and means suspended in said hollow body providing an inertia force adapted to counteract wheel hop excitation.

2. In combination, a vehicle wheel including a tire rim, a brake drum, said rim and said drum being arranged in concentric relation providing an annular cavity therebetween, a non-rotatable hollow body disposed in said cavity, and an inertia mass oscillatable in said hollow body to counteract wheel hop excitation.

3. In combination, a vehicle wheel including a tire rim, a brake drum, said rim and said drum being arranged in concentric relation providing an annular cavity therebetween, a non-rotatable toroidal body disposed in said cavity, and an elongated arcuate inertia mass oscillatable in said toroidal body to counteract wheel hop excitation.

4. In combination, a vehicle wheel including a tire rim, a brake drum, said rim and said drum being arranged in concentric relation providing an annular cavity therebetween, a non-rotatable toroidal body disposed in said cavity, an inertia mass in said body adapted to oscillate responsive to vertical displacement of said wheel, resilient means disposed between said mass and said body effective to tune the frequency of vibration of said mass to correspond with the natural frequency of vibration of said wheel, and means for damping the amplitude of vibration of said mass.

5. In combination, a wheel support, a vehicle wheel and brake drum rotatably mounted on said support, a tire rim on said wheel, said rim and said drum being substantially coplaner and arranged in concentric relation providing an annular cavity therebetween, a non-rotatable toroidal body disposed in said cavity and resiliently connected to said support, and an inertia mass oscillatable in said body responsive to vertical displacement of said wheel for counteracting wheel hop excitation.

6. In combination, a wheel support, a vehicle wheel and brake drum rotatably mounted on said support, a tire rim on said wheel, said rim and said drum being substantially coplaner and arranged in concentric relation providing an annular cavity therebetween, a non-rotatable toroidal body disposed in said cavity and connected to said support, means separating the forward portion of said body from the rearward portion thereof, and an oscillatable inertia mass in each of said portions adapted to counteract wheel hop force.

7. In combination, a vertically oscillatable wheel support, a wheel spindle on said support, a vehicle wheel and brake drum rotatably mounted on said spindle support, a tire rim on said wheel, said rim and said drum being substantially coplaner and arranged in concentric relation providing an annular cavity therebetween, a non-rotatable toroidal body disposed in said cavity and connected to said support, means separating the forward portion of said body from the rearward portion thereof, and an oscillatable inertia mass in each of said portions adapted to provide forces counteracting wheel hop force.

8. In combination, a wheel support, a vehicle wheel and brake drum rotatably mounted on said support, a tire rim on said wheel, said rim and said drum being substantially coplaner and arranged in concentric relation providing an annular cavity therebetween, a non-rotatable toroidal body disposed in said cavity and connected to said support, means separating the forward portion of said body from the rearward portion thereof in a plane transversely bisecting said wheel, an oscillatable inertia mass disposed in each of said portions, and spring means in each of said portions effective to tune the frequency of oscillation of said mass to correspond with the natural frequency of vibration of said wheel.

9. In a dynamic absorber, an oscillatable inertia mass, resilient means suspending said mass and effective to cause oscillation of the latter at a preselected frequency, and guide means for said mass defining the path of movement thereof, said guide means being formed and arranged so that during normal amplitude of oscillation of said mass the latter travels in a path substantially parallel with the direction of oscillation excitation forces while progressively increasing amplitude of oscillation of said mass causes the latter to approach a direction of movement normal to the direction of oscillation excitation forces.

10. The device defined in claim 9 wherein said guide means comprises a curved casing.

11. The device defined in claim 9 wherein said guide means comprises a semi-circular cylindrical casing whose opposite ends lie in a plane parallel with the plane of oscillation excitation forces.

12. In combination, a supported structure, a supporting structure including a swing arm pivoted to said supported structure, a wheel rotatably mounted at the free end of said arm, and an annular dynamic absorber structure connected to said arm and disposed in nesting relation with said wheel, the geometric centers of said wheel and said absorber being located equidistant from said pivotal connection whereby a ratio factor of unity exists between wheel hop forces and absorber counteracting forces.

13. In combination, a supported structure, a supporting structure including a swing arm pivoted to said supported structure, a spring reacting between said arm and said supported structure, a wheel rotatably mounted at the free end of said arm and an annular dynamic absorber structure resiliently connected to said arm and disposed in nesting relation with said wheel, the geometric centers of said wheel and said absorber being located substantially equidistant from said pivotal connection whereby a ratio factor of unity exists between wheel hop forces and absorber counteracting forces.

14. A damped dynamic absorber comprising a pair of hemi-toroidal casings disposed in endwise abutting relation in a vertical plane, partition means secured between the adjacent ends of said casings, an inertia mass disposed in each of said casings, spring means urging each mass to a neutral vertically centered position in its respective casing, and a friction damper disposed between each mass and its respective casing.

15. A damped dynamic absorber comprising a pair of hemi-toroidal casings disposed in endwise abutting relation in a vertical plane, partition means secured between the adjacent ends of said casings, an arcuate inertia mass slidably disposed in each of said casings, spring means urging each mass to a neutral vertically centered position in its respective casing, and a friction damper disposed between each mass and its respective casing.

16. A damped dynamic absorber comprising a pair of hemi-toroidal casings, means connecting the respective open ends of said casings disposed in abutting relation along a vertical plane, partition means secured between the connected ends of said casings, an inertia mass disposed in each of said casings, said mass comprising an arcuate weight dimensioned to provide running clearance with said casings, spring means disposed between each end of said weight and said partition means for urging each weight to a neutral vertically centered position in its respective casing, a friction damper carried by each mass and engaging its respective casing, and resilient bump stops formed adjacent said partition means to arrest oscillation of asid weight.

17. A damped dynamic absorber comprising a pair of hemi-toroidal casings, means connecting the respective open ends of said casings disposed in abutting relation along a vertical plane, partition means secured between the connected ends of said casings, an inertia mass disposed in each of said casings, said mass comprising an arcuate weight dimensioned to provide running clearance with said casings, anti-friction bearing means carried by said weight and engaging said casings to maintain said running clearance, spring means disposed between each end of said weight and said partition means for urging each weight to a neutral vertically centered position in its respective casing, a friction damper carried by each mass and engaging its respective casing, and resilient bump stops formed adjacent said partition means to arrest oscillation of said weight.

18. The structure defined in claim 17 wherein said bearing means comprises a plurality of rollers formed of plastic material, said rollers being rotatively supported by said casing.

References Cited in the file of this patent

UNITED STATES PATENTS

| | | |
|---|---|---|
| 1,687,296 | Johnson | Oct. 9, 1928 |
| 1,783,348 | Taylor | Dec. 2, 1930 |
| 1,945,874 | Weaver | Feb. 6, 1934 |
| 2,177,897 | Lee | Oct. 31, 1939 |
| 2,256,749 | Phelps | Sept. 23, 1941 |
| 2,354,219 | Newton | July 25, 1944 |
| 2,584,222 | O'Connor | Feb. 5, 1952 |
| 2,636,399 | O'Connor | Apr. 28, 1953 |
| 2,715,951 | Lieber | Aug. 23, 1955 |
| 2,724,983 | O'Connor | Nov. 29, 1955 |
| 2,736,393 | O'Connor | Feb. 28, 1956 |
| 2,746,768 | Bowser | May 22, 1956 |

FOREIGN PATENTS

| | | |
|---|---|---|
| 532,467 | Germany | Aug. 28, 1931 |